Patented Aug. 11, 1925.

1,549,214

UNITED STATES PATENT OFFICE.

JAMES P. PENNY, OF BUFFALO, NEW YORK, ASSIGNOR TO NATIONAL ANILINE & CHEMICAL CO., INC., OF NEW YORK, N. Y., A CORPORATION OF NEW YORK.

TETRAKISAZO DYES.

No Drawing.    Application filed October 29, 1924. Serial No. 746,573.

*To all whom it may concern:*

Be it known that I, JAMES P. PENNY, a citizen of the United States, residing at Buffalo, in the county of Erie, State of New York, have invented certain new and useful Improvements in Tetrakisazo Dyes; and I do hereby declare the following to be a full, clear, and exact description of the invention, such as will enable others skilled in the art to which it appertains to make and use the same.

This invention relates to the manufacture and production of valuable new tetrakisazo dyes which are particularly suitable for dyeing cotton and other vegetable fibers from a neutral or an alkaline bath. Materials dyed with the new dyestuffs also form a part of the present invention.

The new tetrakisazo dyes of the present invention can be obtained by diazotizing and coupling two molecular proportions of the same aminoazo compound, or by coupling one molecular proportion each of two different diazotized aminoazo compounds, with one molecular proportion of 5.5'-dihydroxy-2.2'-dinaphthylurea-7.7'-disulfonic acid (i. e., the symmetrical urea of 2.5-aminonaphthol-7-sulfonic acid).

The aminoazo compounds concerned with and employed in the present invention comprise those derivable from a beta-naphthylamine disulfonic acid as first component and a primary amine of the benzene series having a free para position as second component, and they correspond in general to the following probable formula:

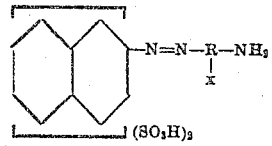

wherein R represents a hydrocarbon radical of the benzene series and $x$ represents a hydrogen atom which may be replaced by an alkoxy group such as, $-OCH_3$, $-OC_2H_5$, etc.

The new tetrakisazo dyes are salts of an acid having most probably the following general formula:

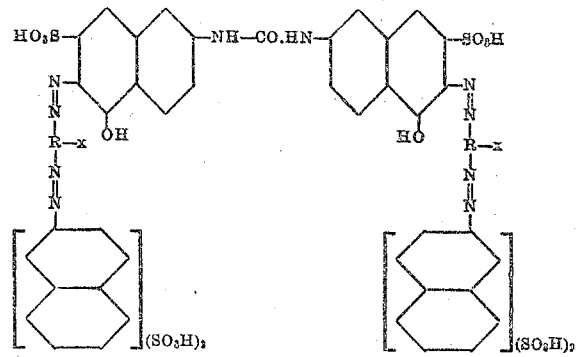

wherein R represents a hydrocarbon radical of the benzene series and $x$ represents a hydrogen atom which may be substituted by an alkoxy group such as $-OCH_3$, $-OC_2H_5$, etc. They have either a symmetrical or an unsymmetrical constitution according to whether two similar or two different aminoazo compounds are employed in their formation. In the dried and pulverized state and in the shape of their sodium salts, they are powders soluble in water giving in general bluish-red to yellowish-red solutions, and soluble in concentrated sulfuric acid giving generally blue to green solutions; yielding upon reduction with stannous chloride and hydrochloric acid, a beta-napthylamine disulfonic acid, a para-diamine of the benzene series and 5.5'-dihydroxy-6.6' diamino-2.2'-dinaphthylurea-7.7'-disulfonic acid; and dyeing cotton from an alkaline or neutral bath yellowish-red to bluish-red tints of excellent fastness to light which are capable of being discharged by the action of reducing agents, such as, for example, sodium hydrosulfite.

The following examples will further illustrate the invention, but it is understood that the invention is not limited thereto. The parts are by weight.

Example 1: 45.1 parts (2 mols) of the sodium salt of the aminoazo compound which can be obtained by coupling one molecular proportion of diazotized 2-naphthylamine-6.8-disulfonic acid with one molecular proportion of the N-methyl-omega-sulfonic acid derivative of aniline (that is, the formaldehyde-bisulfite compound of aniline,

and subsequently eliminating the N-methyl-omega-sulfonic acid group is diazotized with 6.9 parts of sodium nitrite, 30 parts of hydrochloric acid, sp. gr. 1.16, and 900 parts water at a temperature of about 0° to 5° C. Excess of nitrous acid is avoided. To the resulting diazo solution, while being stirred and maintained at a temperature of about 0° to 5° C., there is slowly added an ice-cold solution of 27.4 parts (1 mol) of the sodium salt of 5.5'-dihydroxy-2.2'-dinaphthylurea-7.7'-disulfonic acid and 18 parts sodium bicarbonate dissolved in 500 parts water until a test portion of the mixture shows the presence of only a slight amount of diazo solution and the absence of the disazo derivative which may be formed by the combination of one molecular proportion of the diazotized aminoazo compound with one molecular proportion of the symmetrical urea of 2.5-aminonaphthol-7-sulfonic acid. At the completion of the reaction, the mixture should contain an excess of sodium bicarbonate.

When the combination is complete, the dyestuff is precipitated by the addition of common salt, filtered off, pressed and dried.

The new dyestuff thus obtained is the sodium salt of an acid having the following probable formula:

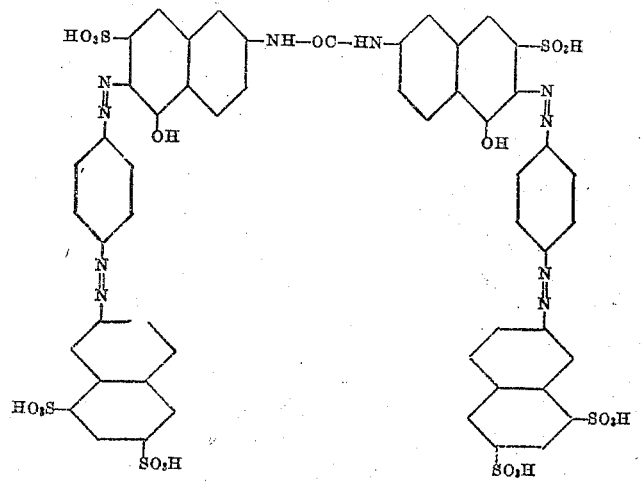

and in the dried and pulverized state in the shape of its sodium salt is a grayish powder soluble in water giving a bluish-red solution, and soluble in concentrated sulfuric acid giving a greenish solution which on the addition of ice produces a violet colored precipitate. Upon reduction with stannous chloride and hydrochloric acid it is decomposed and yields 2-aminonaphthalene-6.8-disulfonic acid, 1:4-diaminobenzene, and the symmetrical urea of 2.6-diamino-5-naphthol-7-sulfonic acid. It dyes cotton from a neutral or alkaline bath bluish-red tints which are of excellent fastness toward light and are capable of being discharged by the action of sodium hydrosulfite.

Example 2: 45.1 (1 mol) parts of the sodium salt of the aminoazo compound which can be obtained by coupling diazotized 2-naphthylamine-6.8-disulfonic acid with the formaldehyde-bisulfite compound of aniline and subsequently eliminating the formaldehyde-bisulfite group are dissolved in 900 parts of water containing 29.4 parts of hydrochloric acid; sp. gr. 1.16, and diazotized at a temperature of about 0° to 5° C. with 6.9 parts sodium nitrite. The resulting diazo solution is then added to a solution of 54.8 parts (1 mol) of the sodium salt of the symmetrical urea of 2.5-amino-naphthol-7-sulfonic acid in 1000 parts water containing sufficient ice to maintain the temperature at about 0° to 5° C., and then slowly adding sodium acetate to the well stirred mixture until a neutral reaction toward Congo red test paper is obtained. Upon the completion of the combination there is added to the solution of the disazo dye thus obtained a diazo solution prepared by diazotizing, with the aid of 6.9 parts sodium nitrite, 29.4 parts of hydrochloric acid, sp. gr. 1.16, and 900 parts water, 49.5 parts (1 mol) of the sodium salt of the aminoazo compound which can be obtained by coupling diazotized 2-naphthylamine-6.8-disulfonic acid with cresidine. Sufficient sodium carbonate is then added to the mixture to render it alkaline toward brilliant yellow test paper. After being stirred at a temperature of 0° to 5° C. for several hours the formation of the dyestuff will be complete. It is then precipitated by the addition of common salt, filtered off, pressed and dried. The dyestuff thus obtained dissolves in water giving a bluish-red solution and in concentrated sulfuric acid giving a greenish-blue solution; and yields upon reduction with stannous chloride and hydrochloric acid 2-naphthylamine-6.8-disulfonic acid, 1.4-diaminobenzene, 3.6-diamino-4-methoxytoluene, and a symmetrical urea of 2.6-diamino-5-naphthol-7-sulfonic acid. It dyes cotton Bordeaux shades from a neutral bath.

Other valuable new tetrakisazo dyes are produced in an analogous manner by employing other aminoazo compounds, for example, such as are obtainable from 2-naphthylamine-6.8-disulfonic acid, 2-naphthylamine-5-7-disulfonic acid, 2-naphthylamine-3.6-disulfonic acid, 2-naphthylamine-4.8-disulfonic acid, 2-naphthylamine-1.6-disulfonic acid, 2-naphthylamine-3.7-disulfonic acid, 2-naphthylamine-4.7-disulfonic acid and other 2-aminonaphthalene disulfonic acids as first component on the one hand and aniline, o- and m-toluidine, xylidine, o- and m-anisidine, 4-methyl-2-amino-1-methoxybenzene and other primary amines of the benzene series having a free para position as second component on the other hand. While the preparation of the aminoazo compounds can be generally effected by the direct combination of the diazotized 2-naphthylamine disulfonic acids with the primary amines of the benzene series having a free para position yet in some cases it is advantageous to proceed by way of the formaldehyde-bisulfite compound of the amine, for example, when coupling into aniline, o-toluidine or o-anisidine, and subsequently eliminating the formaldehyde-bisulfite group in any suitable way or well-known manner.

I claim:.
1. As new products, tetrakisazo dyestuffs having most probably the formula:

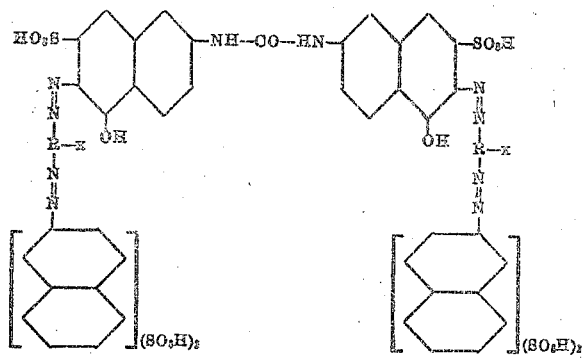

wherein R represents a hydrocarbon radical of the benzene series and $x$ a hydrogen atom which may be replaced by an alkoxy group such as $OCH_3$, $OC_2H_5$, etc.; said dyestuffs in the dry and pulverized state in the shape of their sodium salts being powders soluble in water and in concentrated sulfuric acid; yielding upon reduction with stannous chloride and hydrochloric acid a beta-naphthylamine disulfonic acid, a paradiamine of the benzene series and 5.5'-dihydroxy-6.6'-diamino-2.2'-dinaphthylurea-7.7'-disulfonic acid; and dyeing cotton yellowish-red to bluish-red tints which are capable of being discharged by the action of reducing agents.

2. As new products, tetrakisazo dyestuffs having most probably the formula:

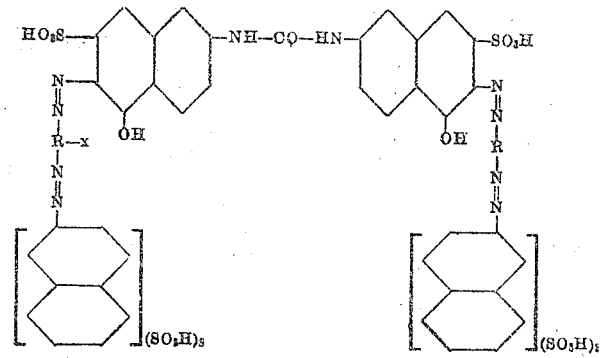

wherein R represents a hydrocarbon of the benzene series and x an alkoxy group such as $OCH_3$, $OC_2H_5$, etc.; said dyestuffs in the shape of their sodium salts being powders soluble in water and in concentrated sulfuric acid; yielding upon reduction with stannous chloride and hydrochloric acid a beta-naphthylamine disulfonic acid, a para-diamine of the benzene series containing an alkoxy group, a para-diamine of the benzene series containing no alkoxy group, and 5.5'-dihydroxy-6.6'-diamino-2.2'-dinaphthylurea-7.7'-disulfonic acid; and dyeing cotton bluish-red to yellowish-red tints which are capable of being discharged by the action of reducing agents.

3. As new products, tetrakisazo dyestuffs having most probably the formula:

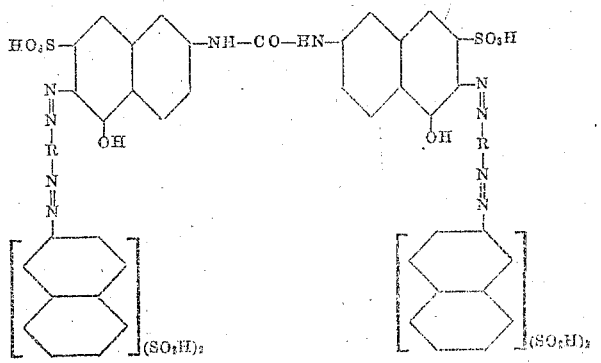

wherein R represents a hydrocarbon radical of the benzene series; said dyestuffs in the dry and pulverized state in the shape of their sodium salts being soluble in water and in concentrated sulfuric acid; yielding upon reduction with stannous chloride and hydrochloric acide a beta-naphthylamine disulfonic acid, a para-diamine of the benzene series containing no alkoxy group, and a symmetrical urea of 2.6-diamino-5-naphthol-7-sulfonic acid; and dyeing cotton bluish-red tints which are capable of being discharged by the action of reducing agents.

4. As new products, tetrakisazo dyestuffs having most probably the formula:

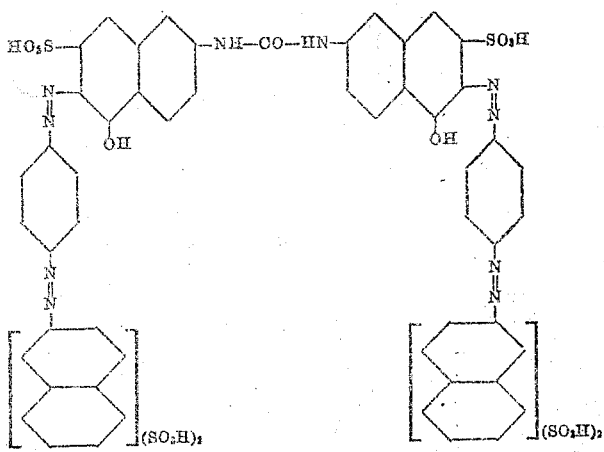

which in the dry and pulverized state in the shape of their sodium salts are grayish powders soluble in water with a bluish-red to a yellowish-red coloration and soluble in concentrated sulfuric acid with a blue to green coloration; yielding upon reduction with stannous chloride and hydrochloric acid a beta-aminonaphthalene disulfonic acid, para-phenylenediamine, and a symmetrical urea of 2.6-diamino-5-naphthol-7- sulfonic acid; and dyeing cotton bluish-red tints which are capable of being discharged by the action of reducing agents.

5. As a new product, the tetrakisazo dyestuff having most probably the formula:

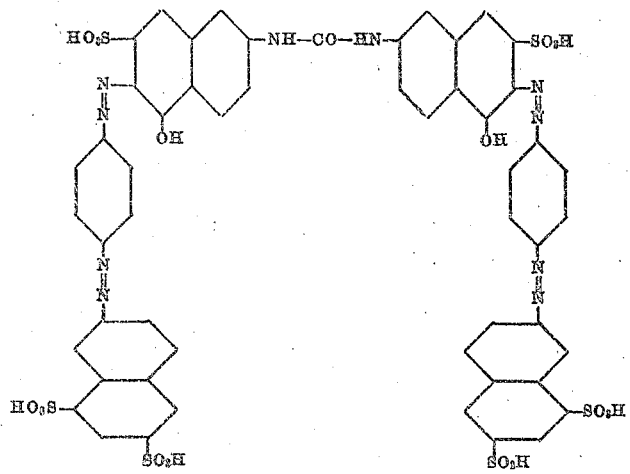

which in the dried and pulverized state and in the shape of its sodium salt is a grayish powder soluble in water giving a bluish-red solution, and soluble in concentrated sulfuric acid giving a greenish solution; yielding upon reduction with stannous chloride and hydrochloric acid 2-naphthylamine-6.8-disulfonic acid, para-phenylenediamine and 5.5'-dihydroxy-6.6'-diamino-2.2'-naphthylurea-7.7'-disulfonic acid; and dyeing cotton bluish-red shades which are capable of being discharged by the action of reducing agents.

6. Material dyed with the dyestuffs of claim 1.

7. Material dyed with the dyestuffs of claim 2.

8. Material dyed with the dyestuffs of claim 3.

9. Material dyed with the dyestuff of claim 4.

10. Material dyed with the dyestuff of claim 5.

In testimony whereof I affix my signature.

JAMES P. PENNY.